No. 607,366. Patented July 12, 1898.
C. HAMEETMAN.
CLOTHES STICK.
(Application filed Jan. 20, 1898.)

(No Model.)

WITNESSES:
Wm. D. Bell.
Louise Snyder.

INVENTOR:
Cornelius Hameetman

BY Gartner & Co
ATTORNEYS.

UNITED STATES PATENT OFFICE.

CORNELIUS HAMEETMAN, OF PATERSON, NEW JERSEY.

CLOTHES-STICK.

SPECIFICATION forming part of Letters Patent No. 607,366, dated July 12, 1898.

Application filed January 20, 1898. Serial No. 667,273. (No model.)

*To all whom it may concern:*

Be it known that I, CORNELIUS HAMEETMAN, a citizen of the United States, residing in Paterson, county of Passaic, and State of New Jersey, have invented certain new and useful Improvements in Clothes-Sticks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my present invention is to provide a clothes-stick of simple and durable construction and by the use of which the scalding, staining, or in any other way injuring or soiling the hands of the operator or surroundings in the removing of goods, clothes, &c., from hot water or dyes contained in boilers, tanks, &c., is fully avoided.

The invention consists in the improved clothes-stick, substantially as will be hereinafter more fully described, and finally embodied in the claim.

Figure 1:
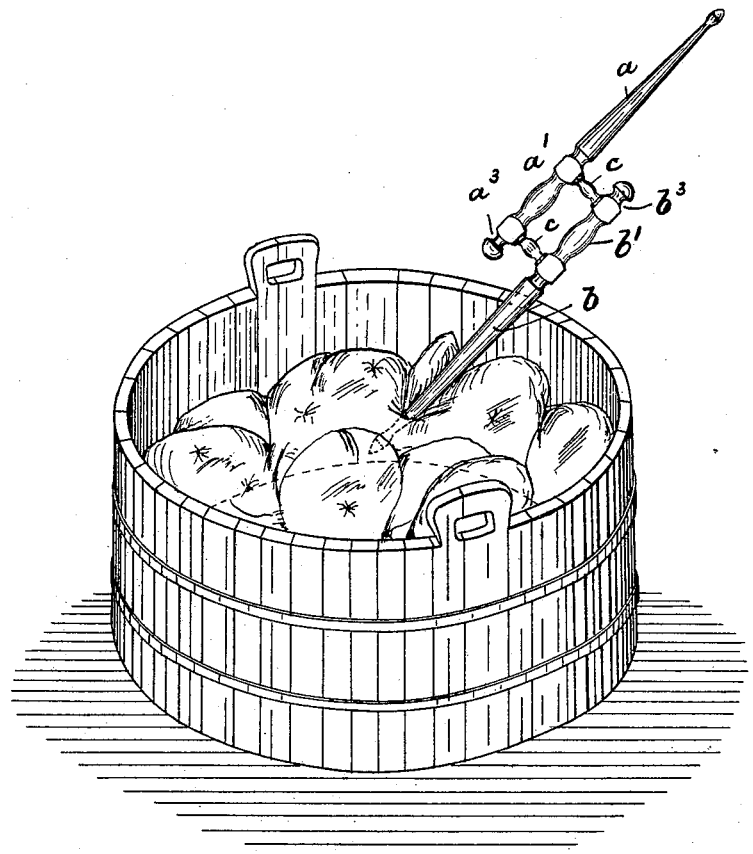
Figure 2:
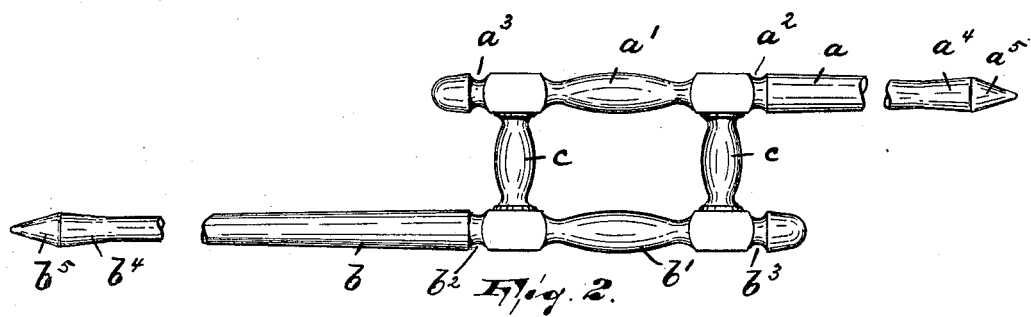

In the accompanying drawings, Figure 1 represents a perspective view of a tub and also of my improved clothes-stick, the latter being shown in engagement with clothes contained in the tub; and Fig. 2, an enlarged detail view of the clothes-stick with certain portions broken away.

The clothes-stick consists of two rods or levers $a$ and $b$, terminating in suitable handles $a'$ and $b'$, which latter are connected by cross-pieces or bridges $c\ c$. The handles $a'$ and $b'$ and also the bridges $c\ c$ are preferably turned, so as to provide convenient handholds when the clothes-stick is being used.

It must be remarked that the levers $a$ and $b$ and their respective handles are arranged parallel with each other, but that they extend in opposite directions, and that each lever is provided with an annular groove $a^2$, (or $b^2$,) arranged between the inner end of the lever and its respective handle, which annular groove is designed to prevent the hot water or dye from running onto the handles and connecting-bridges. At the free end of each handle is also arranged an annular groove $a^3$ and $b^3$, respectively, permitting the liquid, which may have run onto the handles after the stick has been raised out of said liquid and the point been elevated, to drop off back into the tub.

Each lever is provided at its free end with a double cone $a^4\ a^5$ ($b^4\ b^5$), by which arrangement the material to be lifted out of the liquid is readily engaged and prevented from slipping, and, furthermore, the cone $a^5$ will facilitate the inserting of the clothes or dyed goods, for instance, between the rollers of a wringer, as will be manifest.

It must be remarked that the levers $a$ and $b$ may be of equal or different length and can be made of any suitable material.

When the clothes-stick is to be used, it is first placed into substantially the position illustrated in Fig. 1, the hand engaging the handle $a'$, while its respective forearm rests upon the lever $a$, and thus facilitates the lifting of the clothes or goods which are on the end of the lever $b$. After the cone of the lever $b$ has been raised above the level or above the horizontal plane the liquid will run down along the lever $b$ and drop off said lever at its annular groove $b^2$ or $b^3$, and thus the scalding, staining, or in any other way injuring or soiling the hands of the operator or surroundings is prevented.

Having thus described my invention, what I claim as new, and desire to secure by Letters Patent, is—

A clothes-stick consisting of two parallel levers terminating at their inner ends in suitable handles, each of said handles being provided near its free end with an annular groove, while each of the levers is provided at the portion adjacent to its respective handle with an annular groove, cross-pieces or bridges connecting the end portions of the handles, and a double cone at the outer end of each lever, all said parts, substantially as and for the purposes described.

In testimony that I claim the foregoing I have hereunto set my hand this 15th day of January, 1898.

CORNELIUS HAMEETMAN.

Witnesses:
ALFRED GARTNER,
WM. D. BELL.